March 26, 1935.  W. P. MOORE  1,995,996
WEIGHT RECORDING INSTRUMENT OR DYNAMOMETER
Filed March 30, 1933
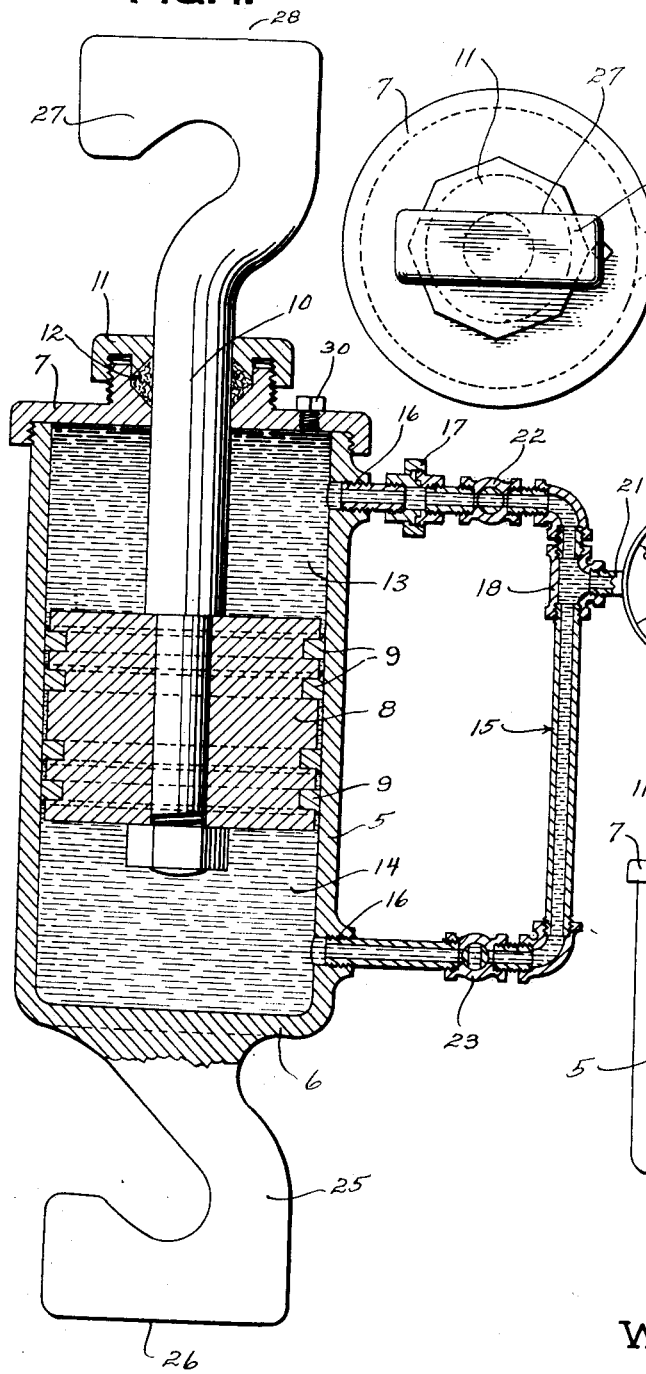
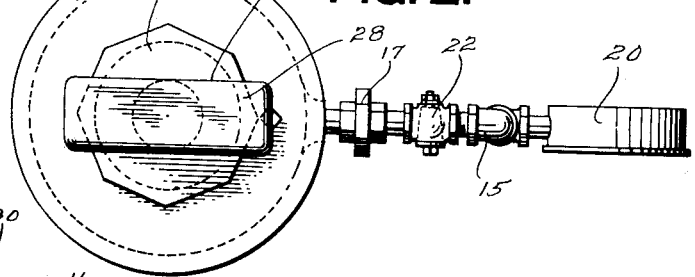
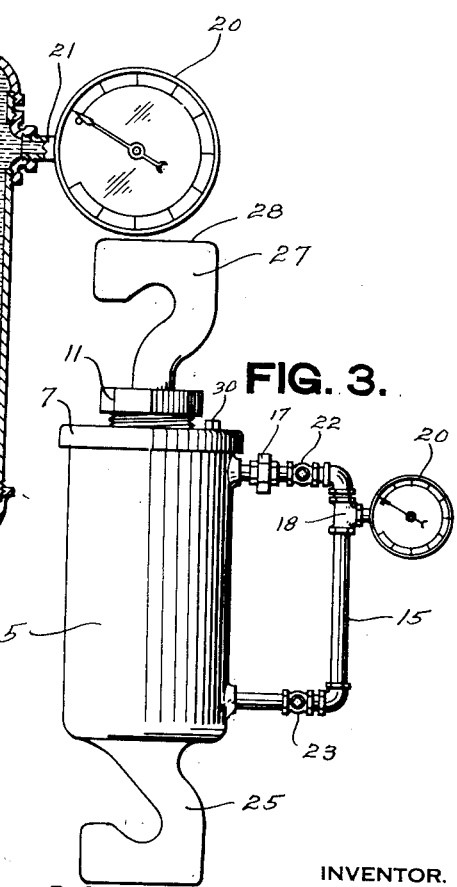
INVENTOR.
William P. Moore
BY *Lancaster, Allwine & Rommel*
ATTORNEYS.

Patented Mar. 26, 1935

1,995,996

UNITED STATES PATENT OFFICE 1,995,996

WEIGHT RECORDING INSTRUMENT OR DYNAMOMETER

William Phillips Moore, Whittenburg, Tex., assignor to Phillips Petroleum Company, Bartlesville, Okla., a corporation of Delaware Application March 30, 1933, Serial No. 663,613

5 Claims. (Cl. 265—47)

The present invention relates to measuring instruments or dynamometers primarily intended for use in the oil producing industry for measuring heavy loads whether under tension or under compression.

The primary object of the invention is to provide a recording instrument of this character wherein a liquid pressure transmitting medium, acted upon by the load being measured, serves to actuate a recording gauge for recording tension in one position of use of the instrument and recording compression in another position of use of the instrument.

A further object of the invention is to provide a weight recording instrument or dynamometer which may either be used for indicating pull rod and well loads, or for indicating compressive stresses in shafts or rods.

A further and important object of the invention is to provide a hydraulically operated instrument for recording extremely high tension and compression forces without creating possible explosive conditions due to admittance of air into the system.

A still further object of the invention is to provide an instrument of this character wherein no lag due to inertia or flexure of materials will be had since the stresses are transmitted directly to a fluid in direct communication with the recording gauge.

Other objects and advantages of the invention will be apparent during the course of the following detailed description, taken in connection with the accompanying drawing forming a part of this specification and in which drawing:—

Figure 1 is a longitudinal section thru the instrument showing the instrument in a condition for recording tension.

Figure 2 is a top plan view of the instrument.

Figure 3 is a side elevation of the instrument on a reduced scale.

In the drawing, and wherein similar reference characters designate corresponding parts throughout the several views, the instrument comprises a cylinder 5 closed at one end by the end wall 6 and at its opposite end by the head plate or cap 7 which in the example shown has screw threaded connection with the cylinder. If so desired however, the end plate or cap 7 may have a flange connection with the cylinder. Likewise, a removable end plate may be substituted for the integral end wall 6 if so desired.

Arranged within the cylinder 5 is a piston 8 provided with suitable sealing cups or rings 9 of any suitable character for preventing flow of fluid past the piston. Rigidly secured in any preferred manner to the piston 8 is a piston rod 10 which projects through a stuffing box 11 in the end plate 7 and provided with packing 12.

In conditioning the instrument for use, the piston 8 is disposed substantially midway the ends of the cylinder 5 providing chambers 13 and 14 in opposite ends of the cylinder 5.

Connecting the chambers 13 and 14 is a gauge line 15 which may be formed of suitable piping having communication at one end with the chamber 13 and at its other end with the chamber 14. The cylinder 5 is provided adjacent opposite ends with threaded openings 16 into which the ends of the gauge line piping may be threaded, and a union 17 may be provided in the gauge line for making connections. Connected in the gauge line 15 is a T 18 for connection of a suitable pressure recording gauge 20 provided with a nipple 21 threaded into the lateral opening of the coupling 18.

Connected in the gauge line 15 between the chamber 13 and gauge 20 is a control valve 22, while connected in the gauge line between the chamber 14 and gauge 20 is a control valve 23. While in the example shown, these control valves 22 and 23 have been shown in the form of stop cocks, various other forms of valves may be used, but it is preferred that the valves be of a type so that opening and closing of the valves will not change the fluid capacity of the instrument. The valves 22 and 23 serve to seal off communication between their associated cylinder chambers and the recording gauge 20 and are operable to control use of the instrument for measuring either tension or compression strains. Figure 1 shows the valve 22 open permitting communication between the chamber 13 and pressure gauge, and the valve 23 closed shutting off communication between the chamber 14 and the pressure gauge.

Provided on the end wall 6 of the cylinder 5 is a coupling link or hook 25 provided with a flat outer end face 26 disposed at a right angle to the axis of the cylinder 5. The outer end of the cylindrical piston rod 10 is formed with a coupling link or hook 27 formed with a flat outer end face 28 disposed at a right angle to the axis of the cylinder 5.

The entire system is completely filled with an incompressible liquid such as a hydraulic brake fluid whereby the piston 8 is so fluid packed as to prevent any lost motion in operation of the instrument. A filling plug 30 is provided for filling the system and when so doing, both of the control valves 22 and 23 are opened and the piston 8 placed in the desired position, preferably midway the ends of the cylinder. Thus it will be seen that the entire system is fluid packed and upon closing of either one of the control valves 22 or 23, the piston 8 will be held in a position centrally of the cylinder.

In use, if the load to be measured is one of tension, the hooks 25 and 27 are connected in the line of the load with the control valve 23 closed and the control valve 22 opened as shown in Figure 1. The force acting upon the instrument causes the piston 8 to exert a pressure on the liquid in the chamber 13 and which pressure is transmitted through the open valve 22 to the recording gauge 20 and thus indicating the load between the connections 25 and 27. Thus, the pressure exerted on the liquid in the chamber 13 is transmitted through a portion of the gauge line 15 for actuation of the gauge 20.

When applying the instrument for use when the load to be measured is one of compression, the control valve 22 is closed and the control valve 23 opened thus forming communication between the chamber 14 and the recording gauge 20 and shutting off communication between the chamber 13 and the recording gauge. When a compressive force is applied between the end bearing faces 26 and 28, the piston 8 will exert a pressure on the liquid in the chamber 14 and an equal pressure upon the communicating liquid in the gauge line 15 for actuating the recording gauge 20.

Thus it will be seen that in either manner of use of the instrument that the piston acts to exert a pressure on the fluid, and which pressure is transmitted through the same fluid for actuation of the recording gauge in accordance with the selected application of the instrument, whether applied for measuring tension or compression.

Should any leakage occur past the piston 8, both control valves 22 and 23 may be opened to permit centering of the piston. While the coupling links 25 and 27 have been shown in the form of hooks provided with end bearing faces for use when the instrument is used for measuring compression forces, these links may be of various other shapes according to the particular requirements for use of the instrument.

Changes in details may be made to the form of invention herein shown and described, without departing from the spirit of the invention or the scope of the following claims.

I claim:

1. In a dynamometer, a closed cylinder, a piston in the cylinder and provided with a coupling member projecting exteriorly of the cylinder, a by-pass passageway forming communication between portions of the cylinder at opposite sides of the piston, a recording gauge in communication with the by-pass passageway, liquid pressure transmitting means between the piston and gauge, and valve means for selectively controlling communication between the gauge and cylinder at opposite sides of the piston.

2. In an instrument for measuring compression and tension loads, a closed chamber having a by-pass line connecting opposite ends thereof, a piston in the chamber for connection with the load, a liquid pressure transmitting medium completely filling said line and the chamber at opposite sides of the piston, pressure recording gauge means in the by-pass line, and valve means for selectively shutting off communication between the gauge means and closed chambers at opposite sides of the piston.

3. A dynamometer comprising in combination, a cylinder having end walls closing opposite ends thereof, a piston in the cylinder and dividing the cylinder into separate chambers, a gauge line connecting the chambers, two control valves connected in spaced relation in the gauge line, a pressure gauge connected in the gauge line between the valves, a liquid pressure transmitting medium completely filling the chambers and said gauge line, a piston rod connected to the piston and projecting through one end wall of the cylinder, a load engaging means on the opposite end wall of the cylinder, and a load engaging means at the outer end of the piston rod.

4. A dynamometer comprising in combination, a cylinder having end walls closing opposite ends thereof, a piston in the cylinder and dividing the cylinder into separate chambers, a gauge line connecting the chambers, two control valves connected in spaced relation in the gauge line, a pressure gauge connected in the gauge line between the valves, a liquid pressure transmitting medium completely filling the chambers and said gauge line, a piston rod connected to the piston and projecting through one end wall of the cylinder, a coupling hook carried by the opposite end wall of the cylinder and having a flat end face, and a coupling hook formed at the outer end of the piston rod and having a flat end face, said coupling hooks permitting measuring of compression and tension loads.

5. A dynamometer for measuring either tension or compression loads comprising in combination, a cylinder having end walls closing opposite ends thereof, a piston in the cylinder and dividing the cylinder into sealed apart chambers, pressure recording gauge means for said chambers, a liquid pressure transmitting medium completely filling the chambers for actuating the pressure recording gauge means, a piston rod connected to the piston and projecting thru one end wall only of the cylinder, a load engaging means on the opposite end wall of the cylinder, and a load engaging means at the outer end of the piston rod.

WILLIAM PHILLIPS MOORE.